(12) United States Patent
Duesselberg

(10) Patent No.: US 7,554,287 B2
(45) Date of Patent: Jun. 30, 2009

(54) DEVICE FOR LOCKING AN ELECTRIC TOOL WITH A RECHARGEABLE BATTERY PACK

(75) Inventor: Achim Duesselberg, Hangzhou (CN)

(73) Assignee: Robert Bosch GmbH, Stuttgart (DE)

( * ) Notice: Subject to any disclaimer, the term of this patent is extended or adjusted under 35 U.S.C. 154(b) by 688 days.

(21) Appl. No.: 11/220,104

(22) Filed: Sep. 6, 2005

(65) Prior Publication Data

US 2006/0055369 A1    Mar. 16, 2006

(30) Foreign Application Priority Data

Sep. 10, 2004    (DE)    ............ 10 2004 043 823

(51) Int. Cl.
*H02J 7/00* (2006.01)
(52) U.S. Cl. .................... 320/107; 320/112
(58) Field of Classification Search ........... 320/107, 320/112; 429/97; 439/341
See application file for complete search history.

(56) References Cited

U.S. PATENT DOCUMENTS

| | | | | |
|---|---|---|---|---|
| 5,401,592 A | | 3/1995 | Gilpin et al. | |
| 5,689,824 A | * | 11/1997 | Nagai | 455/575.3 |
| 5,716,730 A | * | 2/1998 | Deguchi | 429/97 |
| 5,805,069 A | * | 9/1998 | Mitsui et al. | 340/636.1 |
| 6,602,635 B1 | * | 8/2003 | Laitinen et al. | 429/123 |
| 2003/0039880 A1 | | 2/2003 | Turner et al. | |
| 2003/0071598 A1 | * | 4/2003 | Kubale et al. | 320/107 |

FOREIGN PATENT DOCUMENTS

EP    1205282    5/2002

* cited by examiner

*Primary Examiner*—Edward Tso
*Assistant Examiner*—Alexis Boateng
(74) *Attorney, Agent, or Firm*—Michael J. Striker

(57) ABSTRACT

A device for locking an electric tool with a rechargeable battery pack has at least one locking bar mounted on one element selected from the group consisting of the electric tool and rechargeable battery pack in a manner that allows it to move against a spring force, whereby when the electric tool and rechargeable battery pack are joined, the locking bar is engaged in succession in a first and a second recess of the other element selected from the group consisting of the electric tool and rechargeable battery pack, and is retained tightly in the second recess by a force of a spring and, to release a lock, is manually disengaged from the second recess, wherein the locking bar is engaged in the first recess while being disengaged from the second recess.

10 Claims, 2 Drawing Sheets

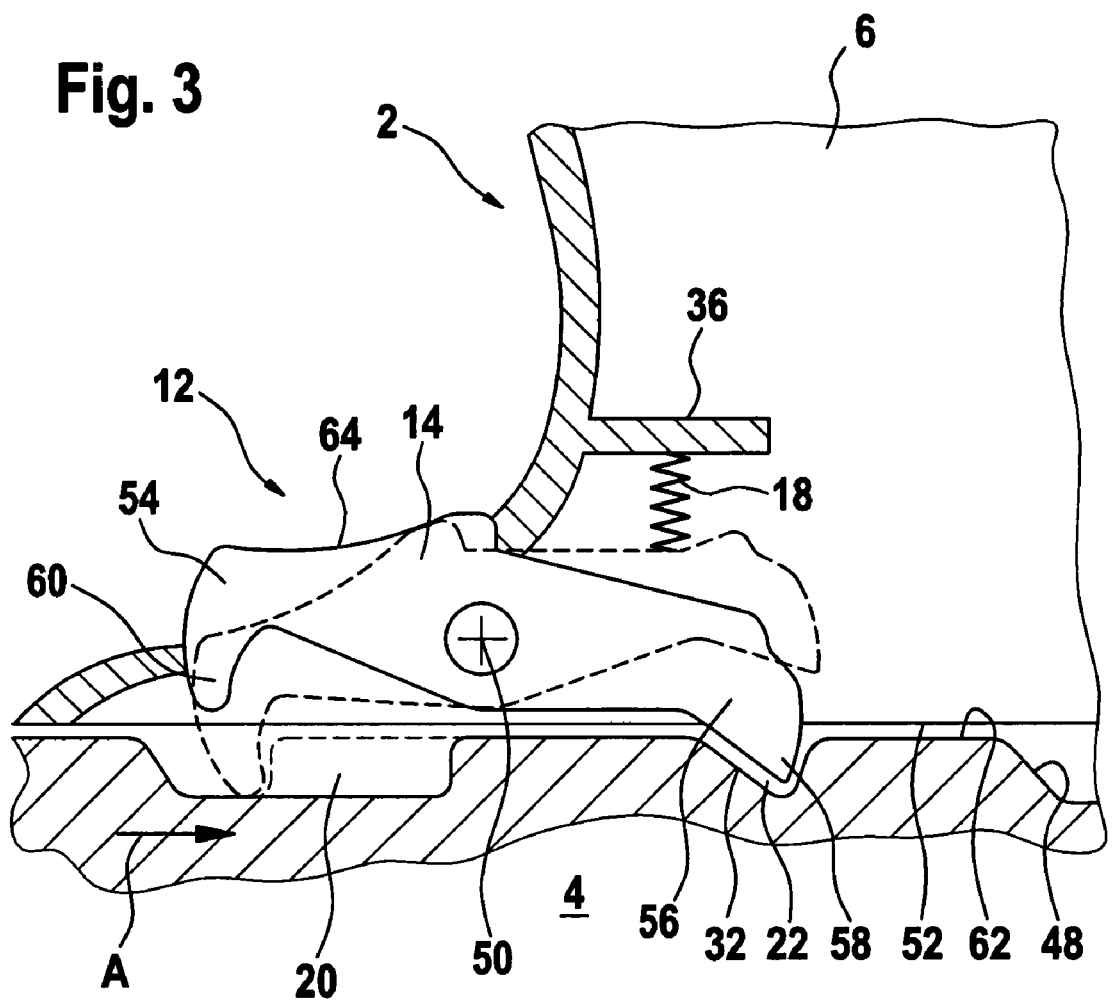

DEVICE FOR LOCKING AN ELECTRIC TOOL WITH A RECHARGEABLE BATTERY PACK

CROSS-REFERENCE

The invention described and claimed hereinbelow is also described in German Patent Application DE 10 200 404 3523.4, filed Sep. 10, 2004. This German Patent Application, whose subject matter is incorporated here by reference, provides the basis for a claim of priority of invention under 35 U.S.C. 119 (a)-(d).

BACKGROUND OF THE INVENTION

The present invention relates to a device for locking an electric tool with a rechargeable battery pack.

In the field of mains-independent electric tools, such as hand-guided drills, drilling hammers and the like, increasingly more powerful machines with increasingly longer operating times are being developed. As a result, increasingly heavier rechargeable battery packs are required to provide the desired amount of energy. As the weight of the rechargeable battery pack increases, however, so does the potential for danger, e.g., if the rechargeable battery pack unexpectedly detaches from the housing of the electric tool—due to wear, contamination, material failure or the like—and falls downward. This could result in a fatal accident if it would occur at a high level.

To prevent unintended detachment of a rechargeable battery pack from a mains-independent electric tool, it is already known—with regard for large, heavy devices, in particular—to provide a "double lock" between the electric tool and the rechargeable battery pack. A double lock of this type is created using a device of the type described initially, which is composed of one or, typically, a plurality of locking bars supported in the housing of the electric tool such that, when the rechargeable battery pack is inserted, they are movable against spring force, and each of which is engaged via spring force in two lock-in grooves located in the rechargeable battery pack in series in the direction of insertion. When the locking bar engages in the first lock-in groove—located in the front, in the direction of insertion—the rechargeable battery pack is secured only relative to the housing, although an electrical connection between connecting contacts of the rechargeable current accumulator of the rechargeable battery pack and an electric circuit of the load of the electric device is not established until the locking bar engages in the second lock-in groove, which is second in position in the direction of insertion.

Although this can prevent the rechargeable battery pack from detaching unexpectedly from the electric tool if the locking bar does not engage properly in the rear lock-in groove if it is contaminated, if the spring breaks due to material weakness, or if the lock becomes tight or is completely blocked due to dirt, grease or any other foreign objects that entered the locking-bar recess, a double lock of this type cannot reliably prevent the rechargeable battery pack from falling even if a plurality of locking bars is provided for reasons of redundancy.

SUMMARY OF THE INVENTION

Accordingly, it is an object of the present invention to provide a device for locking an electric tool with rechargeable battery pack, which avoids the disadvantages of the prior art.

In keeping with these objects and with others which will become apparent hereinafter, one feature of the present invention resides, briefly stated, in a device for locking an electric tool with a rechargeable battery pack, comprising at least one locking bar mounted on one element selected from the group consisting of the electric tool and rechargeable battery pack in a manner that allows it to move against a spring force, whereby when the electric tool and rechargeable battery pack are joined, said locking bar is engaged in succession in a first and a second recess of the other element selected from the group consisting of the electric tool and rechargeable battery pack, and is retained tightly in said second recess by a force of a spring and, to release a lock, is manually disengaged from said second recess, wherein said locking bar is engaged in said first recess while being disengaged from said second recess.

When the device is designed in accordance with the present invention, it has the advantage that, even if the spring would break or the locking bar would not engage completely or at all in the second recess because it is tight, the rechargeable battery pack is retained securely relative to the electric tool, since, in these cases, the locking bar is engaged in the first recess in a manner that differs from that of the related art and prevents the rechargeable battery pack from falling.

A preferred embodiment of the present invention provides that, when the rechargeable battery pack is released from the electric device, the locking bar is disengaged from the first recess by the force of the spring, enabling it to be retained in the first recess if the spring would break or if the locking-bar guide would become tight. When the lock functions properly, it is disengaged from the first recess automatically, i.e., without any further manual operation of the locking bar, so that only one actuation of the locking bar is required—as is the case with conventional tools for releasing the connection—i.e., to disengage the locking bar from the second recess.

According to a further preferred embodiment of the present invention, when the electric tool and the rechargeable battery pack are joined, the locking bar is automatically engaged in the first recess against spring force, preferably via a guiding pivoted member of the electric tool located in front of the second recess in the direction of motion of the rechargeable battery pack during attachment, and advantageously has a slanted edge that interacts with a corresponding slanted edge of the locking bar during joining to engage it in the first recess against spring force.

The second recess can be located behind or in front—in the direction of motion of the rechargeable battery pack when it is joined with the electric tool—of the first recess and preferably has a form that is nearly complementary to that of the free end of the locking bar, while the first recess is larger. As a result, when the locking bar engages in the first recess, a certain translatory relative motion between the rechargeable battery pack and the electric tool is possible. This makes it possible, when the rechargeable battery pack and the electric tool are joined, for the locking bar to subsequently engage in the second recess, and, if the spring would break or the locking bar would become tight, it signals to the user—via the relative mobility—that locking did not occur properly.

The means of attaining the object of the invention according to the present invention is suited for designs in which the locking bar is engaged in the first or second recess via a translatory motion transversely to the direction of motion when the rechargeable battery pack is joined with the electric tool, and for designs in which the locking bar is pivotably supported and engagement with the first or second recess takes place by pivoting the locking bar. In the first case, the locking bar preferably has two free, diametrically opposed ends, one of which is engaged in the first recess and the other of which is engaged in the second recess. In the latter case, the locking bar is advantageously designed as a two-armed rocker, one of the arms of which engages in the first recess, and the other arm of which engages in the second recess.

As with typical devices for locking rechargeable battery packs, the locking bar is preferably integrated in the electric tool, while the recesses are provided in the rechargeable battery pack. The reverse arrangement is also feasible.

The novel features which are considered as characteristic for the present invention are set forth in particular in the appended claims. the invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 shows a partially cut side view of another connection between an electric tool and a rechargeable battery pack with a locking device according to the present invention.

DESCRIPTION OF THE PREFERRED EMBODIMENTS

Figure 1:
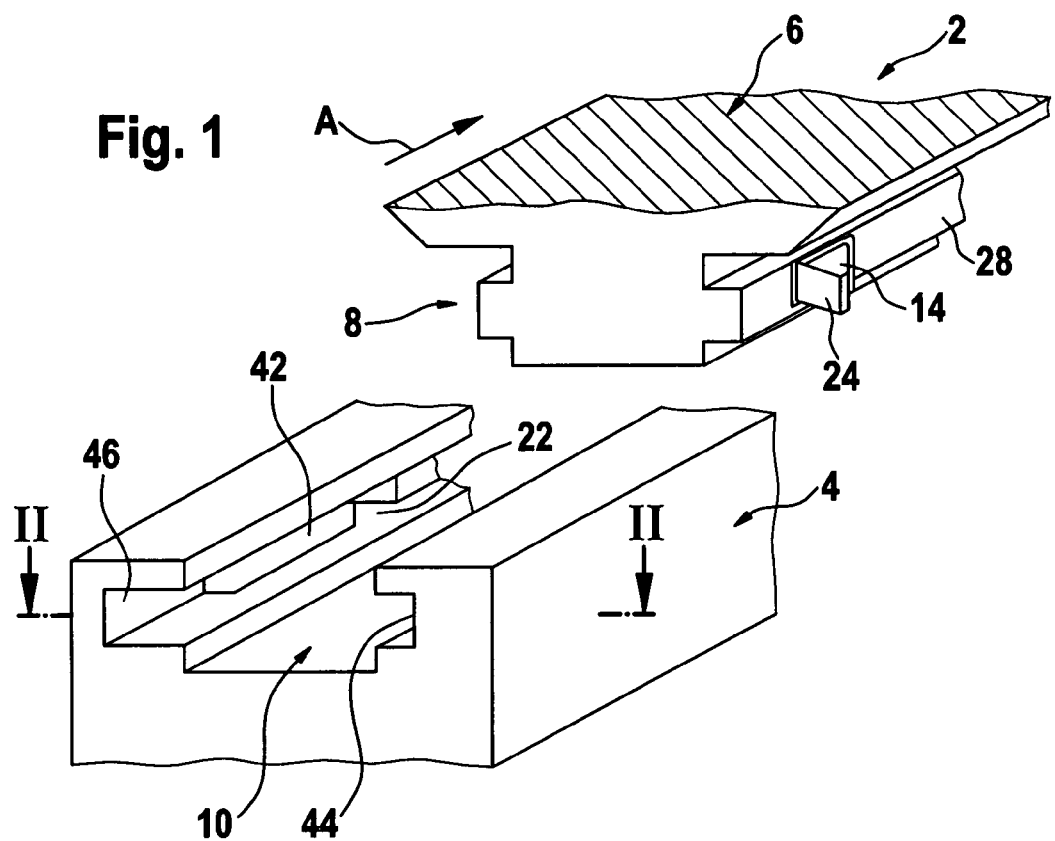
FIG. 1 shows a partially cut-away perspective view of a connection between an electric tool and a rechargeable battery pack with a locking device according to the present invention.

The locking devices shown in the drawing serve to mutually lock a mains-independent electric tool 2, e.g., a hand-guided drilling hammer, and a rechargeable battery pack 4 required to supply power to electric tool 2.

As shown best in FIG. 1, electric tool 2 has, in a known manner, a projecting guide rail 8 on the free lower end of its gripping surface 6, that can be slid in the direction of arrow A into a guide groove 10 formed in the upper end of rechargeable battery pack 4, the guide groove having a cross section that is complementary to the cross section of guide rail 8. The insertion motion of guide rail 8 into guide groove 10 is limited by interacting stops (not shown) that bear against each other when rechargeable battery pack 4 is locked properly with electric tool 2 and an electrical connection between connecting contacts of a current accumulator of rechargeable battery pack 4 and an electrical circuit of a load of electric tool 2 is established.

Locking device 12, which serves to lock rechargeable battery pack 4 with electric tool 2, includes a locking bar 14 that is movably supported in a locking-bar recess 16 of guide rail 8 against the force of a coil compression spring 18 and engages successively in two locking-bar recesses 20, 22 provided in guide groove 10 of rechargeable battery pack 4 and, in fact, in a first locking-bar recess 20 (shown only in FIGS. 2 and 3), whereby this engagement results in a temporarily locked state without establishing an electrical connection between the connecting contacts of rechargeable battery pack 4 and electric tool 2, and a second locking-bar recess 22, whereby this engagement ensures proper locking of rechargeable battery pack 4 relative to electric tool 2 and the establishment of an electrical connection between them.

Figure 2:
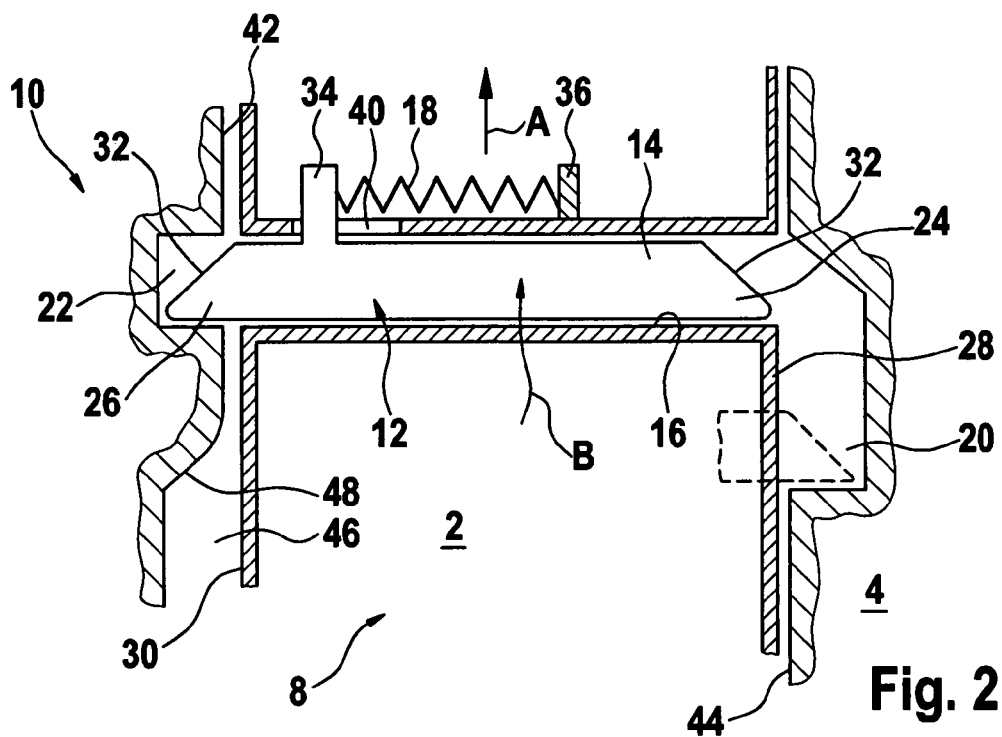
FIG. 2 shows a side view of the locking device along the plane II-II in FIG. 1 after the electric tool and rechargeable battery pack have been joined.

With locking device 12 shown in FIGS. 1 and 2, locking bar 14 has an essentially bar-shaped configuration and is displaceable in a translatory manner against the force of spring 18 transversely to the direction of insertion (arrow A) in locking-bar recess 16. Its length is adapted to the length of locking-bar recess 16 such that one of the two diametrically opposed ends 24, 26 extends over a lateral guide surface 28, 30 of guide rail 8 to an extent corresponding to the depth of each locking-bar recess 20, 22 when the tip of the other end 26, 24 is flush with diametrically opposed guide surface 30, 28 (refer to FIG. 2). Both ends 24, 26 have slanted edges 32 that point in the direction of insertion. A projection 34 that extends laterally above locking bar 14 serves as an abutment for one end of spring 18, and the other end bears against an abutment 36 fixed in position in the interior of guide rail 8. Projection 34 penetrates a slotted opening 40, the lateral, diametrically opposed edges of which limit the travel of locking bar 14.

As best shown in FIG. 2 and, to a partial extent, in FIG. 1, the two locking-bar recesses 20, 22 are formed in two diametrically opposed lateral surfaces 42, 44 of guide groove 10 that are located at a slight distance from lateral guide surfaces 30, 28. While first locking-bar recess 20—located in the front, in the direction of insertion—is located in lateral surface 44 of guide groove 10 adjacent to abutment 36, second locking-bar recess 22—located in the rear, in the direction of insertion—is located in diametrically opposed lateral surface 42 of guide groove 10 adjacent to projection 34.

Lateral surface 42 also has a further recess 46 that extends in the direction of insertion from the front end of guide groove 10 outward and past the front end of diametrically opposed, first locking-bar recess 20 and, on the other side thereof, is provided with a slanted edge 48. Slanted edge 48 ensures that, when guide rail 8 is inserted into guide groove 10, locking bar 14 is first pressed, with its end 24, against the force of spring 18 into first locking-bar recess 20, as shown in FIG. 2 with dashed lines, and is retained therein until rechargeable battery pack 4 reaches the end position shown in FIG. 2 in which spring 18 simultaneously presses locking bar 14, via its one end 24, out of recess 20 and, via its other end 26, into recess 22. The motion made by locking bar 14 during insertion corresponds to the shape of curve B shown in FIG. 2.

To unlock rechargeable battery pack 4, locking bar 14 is slid against the force of spring 18 using an operating button (not shown) that acts on locking bar 14 or projection 32, whereby its end 26 disengages from recess 22 and, simultaneously, its other end 24 is engaged in recess 20 and, in fact, before end 26 leaves recess 22.

After rechargeable battery pack 4 is inserted, at least one of the two ends 24, 26 of locking bar 14 therefore always engages in adjacent recess 20, 22, thereby reliably preventing detachment of rechargeable battery pack 4, even if spring 18 breaks or locking bar 14 becomes tight, if the force of spring 18 is not sufficient to press the locking bar into recess 22.

In contrast, with locking device 12 shown in FIG. 2, with which the same parts are labeled with the same reference numerals, locking bar 14 is designed as a two-armed rocker that is supported such that it can pivot around an axis 50 in the lower end of gripping surface 6 of electric tool 2. When rechargeable battery pack 4 is inserted in a guide 52 of gripping surface 6, one arm 56 of rocker 14 is pressed by the force of spring 18 from the top against a top side 26 of rechargeable battery pack 4 provided with two locking-bar recesses 20, 22. As a result, its free end 58 is pressed into second locking-bar recess 22, as shown in FIG. 3 using dashed lines, when rechargeable battery pack 4 reaches its end position in which it is locked relative to electric tool 2 and is electrically connected therewith.

Other arm 54 of rocker 14 is pressed against the force of spring 18 via its free end 60 into first locking-bar recess 20, as shown in FIG. 3 with dashed lines, when free end 58 of arm 56 moves when rechargeable battery pack 4 is inserted into guide 52 via a guide projection 62 located in front of recess 22 in the direction of insertion, or when pressure is exerted manually on an operating surface 64 of arm 54 to manually disengage end 58 of other arm 56 to manually remove rechargeable battery pack 4 from recess 22.

Similar to the exemplary embodiment shown in FIGS. 1 and 2, at least one of the two ends 58, 60 of rocker is always engaged in recess 22 or 20, thereby reliably preventing unintended disengagement of the connection; when end 60 engages in recess 20, this is ensured by the fact that it strikes a limiting face of recess 20 that is perpendicular to the direction of insertion, as shown using dashed lines.

To ensure redundancy and thereby increase safety, the device according to the present invention can also include two or more locking bars 14 of the type described above, located in series in the direction of insertion, whereby each locking bar 14 has the design according to the present invention and they engage, in succession, in first and second recesses 20 and 22.

The concept "rechargeable battery pack" 4 used within the framework of this application refers primarily to a pack with rechargeable current accumulators (rechargeables), although a pack with disposable current accumulators (batteries) is also intended. In addition, any geometry other than the geometry of the connection between rechargeable battery pack 4 and electric tool 2 shown in the drawing can be used, e.g., a slot in electric tool 2 into which rechargeable battery pack 4 is partially inserted. In addition, the locking device 12 described is suited not only for locking rechargeable battery pack 4 with electric tools 2, but also any other mains-independent electrical devices.

It will be understood that each of the elements described above, or two or more together, may also find a useful application in other types of constructions differing from the types described above.

While the invention has been illustrated and described as embodied in a device for locking an electric tool with a rechargeable battery pack, it is not intended to be limited to the details shown, since various modifications and structural changes may be made without departing in any way from the spirit of the present invention.

Without further analysis, the foregoing will reveal fully revel the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims.

The invention claimed is:

1. A device for locking an electric tool with a rechargeable battery pack, comprising at least one locking bar mounted an one element selected from the group consisting of the electric tool and the rechargeable battery pack in a manner that allows it to move against a spring force, whereby when the electric tool and the rechargeable battery pack are joined, said looking bar is engaged in succession in a first and a second recess of the other element selected from the group consisting of the electric tool and the rechargeable battery pack, and is retained tightly in said second recess by a force of a spring and, to release a lock, is manually disengaged from said second recess, wherein said locking bar is engaged in said first recess while being disengaged from said second recess, and wherein during engagement of said locking bar in said first recess, said rechargeable battery pack is retained against unintended disengagement from the electric tool.

2. A device as defined in claim 1, wherein said locking bar and said recesses are configured so that, when the rechargeable battery pack is being detached from the electric tool, said locking bar is disengaged from said first recess by the force of said spring.

3. A device as defined in claim 1, wherein said locking bar and said recesses are formed so that when the electric tool and rechargeable battery pack are joined, said locking bar is automatically engaged in said first recess against the force of said spring.

4. A device as defined in claim 3, wherein said locking bar has a slanted edge that interacts with another slanted edge when the electric tool and rechargeable battery pack are joined, to move the locking bar into said first recess.

5. A device as defined in claim 1, wherein said first recess is larger than said second recess.

6. A device as defined in claim 1, wherein said locking bar is movable transversely to a direction of motion during joining and engages in said first or second recess with diametrically opposite ends.

7. A device as defined in claim 1, wherein said locking bar is pivotable and has two arms that engage with said first or second recess when said locking bar is swiveled.

8. A device as defined in claim 1; and further comprising another locking bar, said locking bars being located in succession in said one element selected from group consisting of the electric tool and the rechargeable battery pack and engage in said recesses in diametrically opposed surfaces of the other element selected from the group consisting of the electric tool and the rechargeable battery pack.

9. An electric tool system, comprising an electric tool; a rechargeable battery pack; and a device for locking said electric tool with said rechargeable battery pack, said locking device including at least one locking bar mounted on one element selected from the group consisting of the electric tool and the rechargeable battery pack in a manner that allows it to move against a spring force, whereby when the electric tool and the rechargeable battery pack are joined, said locking bar is engaged in succession in a first and a second recess of the other element selected from the group consisting of the electric tool and the rechargeable battery pack, and is retained tightly in said second recess by a force of a spring and, to release a lock, is manually disengaged from said second recess, wherein said locking bar is engaged in said first recess while being disengaged from said second recess, and wherein during engagement of said locking bar in said first recess, said rechargeable battery pack is retained against unintended disengagement from the electric tool.

10. An electric tool system as defined in claim 9, wherein said locking bar is provided in said electric tool while said recesses are provided in said rechargeable battery pack.

* * * * *